(12) United States Patent
Birkeland (10) Patent No.: US 9,038,513 B2
(45) Date of Patent: May 26, 2015

(54) CUTTING DEVICE, METHOD AND USE FOR CUTTING OF A LINE EXTENDING FROM A FLOATING VESSEL

(71) Applicant: Smart Installations AS, Tananger (NO)

(72) Inventor: Petter Birkeland, Tananger (NO)

(73) Assignee: Smart Installations AS, Tananger (NO)

(*) Notice: Subject to any disclaimer, the term of this patent is extended or adjusted under 35 U.S.C. 154(b) by 0 days.

(21) Appl. No.: 14/192,335

(22) Filed: Feb. 27, 2014

(65) Prior Publication Data

US 2014/0208906 A1    Jul. 31, 2014

Related U.S. Application Data

(63) Continuation of application No. 13/510,264, filed as application No. PCT/NO2010/000418 on Nov. 15, 2010, now Pat. No. 8,714,062.

(30) Foreign Application Priority Data

Nov. 17, 2009  (NO) .................................. 20093358

(51) Int. Cl.
*B26D 1/00* (2006.01)
*B26D 7/02* (2006.01)
*B26D 7/10* (2006.01)
(Continued)

(52) U.S. Cl.
CPC  *B26D 7/10* (2013.01); *B23D 15/00* (2013.01); *B26D 1/04* (2013.01); *B26D 5/12* (2013.01); *B26F 3/04* (2013.01); *B63B 21/18* (2013.01); *B63B 21/22* (2013.01); *B26D 7/14* (2013.01); *B63B 43/02* (2013.01); *B26D 1/09* (2013.01)

(58) Field of Classification Search
USPC .......... 83/461, 13, 435.22, 563, 566; 30/90.8, 30/91.2; 144/221 A
See application file for complete search history.

(56) References Cited

U.S. PATENT DOCUMENTS 2,248,642 A    7/1941  Phillips
2,758,490 A    8/1958  Williams
(Continued)

FOREIGN PATENT DOCUMENTS

EP    0 124 307 A1    11/1984
GB    191507793 A     12/1915
(Continued)

OTHER PUBLICATIONS

International Search Report for parent application PCT/NO2010/000418, having a mailing date of Feb. 23, 2011.
(Continued)

*Primary Examiner* — Omar Flores Sanchez
(74) *Attorney, Agent, or Firm* — Andrus Intellectual Property Law, LLP (57) ABSTRACT

Cutting device, method and use are for cutting of a line extending from a floating vessel. The cutting device is structured for placement on the vessel. The cutting device comprises: at least one guide structured for directional steering of the line past a cutting area for the line; and at least one of the following cutting-promoting devices: at least one induction coil device directed inwards toward the cutting area and structured for heating, hence weakening, of the line within the cutting area; and at least one moveable cutting knife with an opposite contact surface directed inwards toward the cutting area and also structured for cutting of the line within the cutting area.

23 Claims, 6 Drawing Sheets

(51) Int. Cl.
  *B23D 15/00* (2006.01)
  *B26D 1/04* (2006.01)
  *B26D 5/12* (2006.01)
  *B26F 3/04* (2006.01)
  *B63B 21/18* (2006.01)
  *B63B 21/22* (2006.01)
  *B63B 43/02* (2006.01)
  *B26D 1/09* (2006.01)
  *B26D 7/14* (2006.01)

(56) References Cited

U.S. PATENT DOCUMENTS

| | | |
|---|---|---|
| 3,760,674 A | 9/1973 | Temple et al. |
| 4,016,728 A | 4/1977 | Mason |
| 4,026,028 A | 5/1977 | Green |
| 4,463,496 A | 8/1984 | Reich et al. |
| 4,829,865 A | 5/1989 | Nunnery et al. |
| 5,209,175 A | 5/1993 | Cintron |
| 6,024,145 A | 2/2000 | Ackles |
| 7,922,424 B2 | 4/2011 | Clark, II |
| 8,028,466 B1 | 10/2011 | Schrock et al. |
| 2009/0314149 A1 | 12/2009 | Clark, II |
| 2010/0005940 A1 | 1/2010 | Clark et al. |
| 2011/0138983 A1 | 6/2011 | Clark et al. |

FOREIGN PATENT DOCUMENTS

| | | |
|---|---|---|
| WO | 2007096307 A1 | 8/2007 |
| WO | 2009104768 A1 | 8/2009 |
| WO | 2010024684 A1 | 3/2010 |
| WO | 2010046569 A1 | 4/2010 |

OTHER PUBLICATIONS

Written Opinion for parent application PCT/NO2010/000418, having a mailing date of Feb. 23, 2011.

Applicant's reply of Sep. 16, 2011 to Written Opinion for parent application PCT/NO2010/000418, having a mailing date of Feb. 23, 2011.

International Preliminary Report on Patentability for parent application PCT/NO2010/000418, having a completion date of Nov. 2, 2011.

CUTTING DEVICE, METHOD AND USE FOR CUTTING OF A LINE EXTENDING FROM A FLOATING VESSEL

CROSS-REFERENCE TO RELATED APPLICATIONS

This application is a continuation application of U.S. patent application Ser. No. 13/510,264, filed on Jul. 16, 2013 which is incorporated herein by reference. The '264 application is the U.S. national stage application of International Application No. PCT/NO2010/000418, filed Nov. 15, 2010, which International application was published on May 26, 2011 as International Publication No. WO 2011/062504 A1 in the English language and which application is incorporated herein by reference. The International application claims priority of Norwegian Patent Application No. 20093358, filed Nov. 17, 2009, which application is incorporated herein by reference.

AREA OF INVENTION

The present invention concerns a cutting device, a method and a use for cutting of a line extending from a floating vessel.

For example, the vessel may be comprised of a boat or a floating installation. As an example, the boat may be comprised of an anchor handling vessel, whereas the floating installation may be comprised of a drilling rig or a drilling ship. Said line may be comprised of, for example, a chain, a wire or a fibre line, possibly an assembly of to such line types.

It is to be possible, by means of the present invention, to carry out a quick, controlled and safe cutting of the line on board the vessel, for example in an emergency situation. In order to avoid damage to personnel and equipment, remote-controlled cutting may also be carried out.

BACKGROUND OF THE INVENTION

The background of the invention is emergency situations that have occurred at sea in context of handling big loads from floating vessels, particularly during bad weather conditions. Under such conditions, a big load may become unmanageable, for example displaced, whereby the vessel and its crew are at risk of becoming seriously damaged and/or shipwrecked.

Particularly in context of towing and relocation of mobile installations at sea, it is customary to use so-called anchor handling vessels. Such vessels comprise spooling apparatuses for spooling of chains, fibre lines and/or wires. The purpose of such a vessel may be to tow a floating installation to a particular position and then to anchor the installation to the seabed by means of a suitable mooring system.

Typically, such a mooring system will comprise a line having a lower end connected to a large and heavy anchor, and having an upper end carried back to the installation. The line may also be a compound line and thus comprise portions of length consisting of different types of line of different shape and/or material type, for example a chain, a fibre line and/or a wire. Thereby, the line may also be of a more or less flexible construction.

For placement and pulling of such an anchor, the associated line will be attached to a spooling apparatus, the apparatus of which generally is disposed at the forward end of the deck of the anchor handling vessel. The line extends from the spooling apparatus, further across the deck and down into the water at the aft end of the vessel. During such an anchor handling operation, the total weight of the anchor and the line may amount to several hundred tonnes. Chain links made of steel, which are used in this context, may possibly have a transverse dimension in the order of 5-10 cm and may a weight in the order of 100-200 kg/meter.

During such an anchor handling operation, however, unforeseen incidents may arise causing the vessel to become exposed to unmanageable forces via the line attached to the vessel. For example, it may relate to the line displacing itself over the side of the vessel and causing it to become lop-sided, which at worst may cause the vessel to capsize and possibly sink.

An example of the latter is the vessel Bourbon Dolphin which, during an anchor handling operation offshore Shetland on Apr. 12, 2007, capsized and finally sunk at a depth of ca. 1100 meters. Several of the vessel's crew members perished in context of the capsizing. The vessel was in the process of pulling up a so-called Bruce anchor attached to a chain and wire having a total weight in the order of 200-300 tonnes.

In view of such unfortunate and disastrous incidents associated with load-burdened lines extending from floating vessels, it would therefore be very advantageous if such lines could be severed as fast as possible in a controlled and safe manner for personnel and equipment, for example via remote control. It would also be advantageous if it was possible to cut all types of line potentially being used on a particular vessel, for example a chain, a fibre line and/or a wire. A technical solution which, when in an emergency situation, brings about such severing possibilities would be able to limit adverse effects and possibly prevent disasters causing crew members, the vessel and/or equipment to perish.

Prior Art

The applicant does not know of any dedicated, technical solution for cutting of a line extending from a floating vessel in context of uncontrollable management of the load on the line. Common practice in such a situation is for the crew to leave as fast as possible from the area within which the line is affected by the uncontrollable load, and that attempts are possibly made of cutting the line by means of a cutting torch or similar. Such an attempt, however, involves a very big risk to the crew carrying out the cutting.

OBJECT OF THE INVENTION

The primary object of the invention is to provide a technical solution for allowing cutting of a line extending from a floating vessel, for example in an emergency situation.

It is also an object of the invention to provide a technical solution wherein the cutting may be carried out quickly and in a safe manner preventing damage to personnel on board the vessel.

How to Achieve the Object

The object is achieved by virtue of features disclosed in the following description and in the subsequent claims.

According to a first aspect of the invention, a cutting device for cutting of a line extending from a floating vessel is provided, wherein the cutting device is structured for placement on the vessel. The distinctive characteristic of the cutting device is that it comprises:
- at least one guide structured for directional steering of the line past a cutting area for the line; and
- at least one of the following cutting-promoting devices:
  - at least one induction coil device directed inwards toward the cutting area and structured for heating, hence weakening, of the line within the cutting area; and at least one moveable cutting knife with an opposite contact surface directed inwards toward the cutting area and also structured for cutting of the line within the cutting area.

Thereby, the cutting device may comprise at least one induction coil device and/or at least one moveable cutting knife with an opposite contact surface.

If required or desirable, the vessel may be provided with several such cutting devices for cutting of several lines extending from the vessel.

For example, said line may be comprised of at least one chain, a metal wire and a fibre line. Further, the cutting area may be arranged within the at least one guide. The cutting area may also be placed on or near a deck on the vessel. Yet further, the line, for spooling thereof, may be connected to a spooling apparatus placed on the vessel.

According to a first embodiment, the cutting device may comprise:
- at least one guide structured for directional steering of a metallic line past the cutting area; and
- at least one induction coil device directed inwards toward the cutting area and also structured for line-severing heating, hence weakening, of the metallic line within the cutting area.

In this first embodiment, no cutting knife/knives is/are used, but only one or more induction coil devices. For example, when a load-burdened, metallic line, e.g. a wire or a chain, extends from the vessel and cutting is required, the at least one induction coil device will be able to quickly heat, hence weaken, the line within the cutting area. Even though the very heating will be able to melt the line and thus sever the line, the load on the line will stretch the line at the same time and will contribute to weaken the line faster and further until the line is severed.

According to a second embodiment, the cutting device may comprise:
- at least one guide structured for directional steering of the line past the cutting area; and
- at least one moveable cutting knife with an opposite contact surface directed inwards toward the cutting area and also structured for cutting of the line within the cutting area.

In this second embodiment, no induction coil device(s) is/are used, but only one or more moveable cutting knives. Also in this second embodiment, the load on the line will contribute to weaken the line faster and further until the line is severed.

According to a third embodiment, the cutting device may comprise:
- at least one guide structured for directional steering of a metallic line past the cutting area;
- at least one induction coil device directed inwards toward the cutting area and structured for heating, hence weakening, of the metallic line within the cutting area; and
- at least one moveable cutting knife with an opposite contact surface directed inwards toward the cutting area and also structured for cutting of the line within the cutting area.

The preceding comments to the first and second embodiment of the cutting device are also applicable to this third embodiment.

According to a fourth embodiment, which comprises a cutting device with at least one induction coil device, the line may comprise a chain composed of chain links, wherein the cutting device is structured for cutting of a chain link within the cutting area and comprises:
- at least one first induction coil device structured for heating, hence weakening, of a first side of the chain link; and
- at least one second induction coil device structured for heating, hence weakening, of a second side of the chain link.

In all embodiments comprising a cutting device with one or more induction coil devices, the at least one induction coil device may be connected to a moving means structured to be moveable inwards toward the cutting area for the line. Thereby, also the one induction coil device will be moveable toward the cutting area.

Alternatively, at least one non-moveable induction coil device, which is structured in a manner allowing it to embrace the line fully or partially, may be used. Thereby, the line will be able to extend through the non-moveable induction coil device during spooling of the line. Such an induction coil device may be structured so as to be mountable and demountable, whereby the induction coil device may be easily assembled around the line prior to handling thereof and also to be demounted after handling of the line.

The cutting device may also comprise an electric power source onto which the at least one induction coil device is connected. Thus, the electric power source may be comprised of the electric power supply of the vessel and/or of at least one battery.

According to a fifth embodiment, which comprises a cutting device with at least one cutting knife, the at least one cutting knife may be connected to a moving means structured to be moveable inwards toward the cutting area for the line. Thereby, also the cutting knife will be moveable toward the cutting area.

According to a sixth embodiment, which also comprises a cutting device with at least one cutting knife, said contact surface for the at least one cutting knife may be comprised of a cooperating cutting knife. In this context, cooperating cutting knives may be arranged in a scissor configuration for cutting of the line. Alternatively, such cooperating cutting knives may be aligned directly opposite each other, i.e. the edges of the knives are axially directed with respect to each other. Further, said contact surface cutting knife may be connected to a moving means structured to be moveable inwards toward the cutting area of the line. Thereby, also the contact surface cutting knife will be moveable toward the cutting area.

Moreover, said contact surface for the at least one cutting knife may have any suitable shape, including a planar surface.

According to a seventh embodiment, which also comprises a cutting device with at least one cutting knife, the line may comprise a chain composed of chain links, wherein the cutting device is structured for cutting of a chain link within the cutting area and comprises:
- at least one first, moveable cutting knife with an opposite contact surface structured for cutting of a first side of the chain link; and
- at least one second, moveable cutting knife with an opposite contact surface structured for cutting of a second side of the chain link.

In this seventh embodiment, the first cutting knife and the second cutting knife may be connected to a moving means structured to be moveable inwards toward the cutting area for the line. Thereby, also the first and second cutting knife will be moveable toward the cutting area.

Further, the contact surface of the first cutting knife may be comprised of a third cutting knife structured for cutting-cooperation with the first cutting knife, whereas the contact surface of the second cutting knife is comprised of a fourth cutting knife structured for cutting-cooperation with the second cutting knife.

Yet further, the first cutting knife and the third cutting knife may be arranged in a scissor configuration for cutting of the first side of the chain link, whereas the second cutting knife and the fourth cutting knife are arranged in a scissor configuration for cutting of the second side of the chain link.

Furthermore, the third cutting knife may be connected to a moving means structured to be moveable toward the first cutting knife, whereas the fourth cutting knife is connected to a moving means structured to be moveable toward the second cutting knife. Thereby, also the third and fourth cutting knife will be moveable toward the cutting area.

In context of cutting chain links, the applicant has shown, via tests, that it is possible to sever chain links in steel having a diameter of 20 mm, 56 mm and 76 mm, and only by means of cutting knives of suitable shape. Among other things, cutting knives having different angles and shapes of the knife edge were tried during the tests. In this context, opposite cutting knives having knife edge angles of 35°, 60°, 75° and 90°, respectively, were used, among other things. The knife edge shape proved to have relatively little influence on the cutting force used for the different diameters of 1.0 chain links. The essential thing was to be able to prove that it was possible to carry out a fast cutting of heavy-duty chain links only by means of suitable cutting knives. A potential heating and weakening of a chain link by means of at least one induction coil device would thus further increase the effectiveness of the cutting.

According to an eight embodiment, the cutting device may also comprise at least one fixing device for fixing of the line during cutting thereof. As such, the fixing device may comprise a recoil brake or recoil clutch structured for engagement with the line. As an addition or alternative, the fixing device may comprise a releasable locking mechanism structured for locking engagement with the line, for example at least one gripping element adapted for gripping of the particular type of line.

Advantageously, the fixing device may also be disposed between the at least one cutting-promoting device of the cutting device and a fastening device of the line on the vessel. Disposed in this manner, the fixing device will be able to fix the line both during the cutting and after the severing thereof, whereby a potentially damaging backlash of the line is prevented.

The cutting device and the fixing device may also be connected to a support, wherein the support is connected to a moving means structured so as to be moveable in the moving direction of the line.

In this manner, the fixing device may be disposed in a particular position relative to the line, for example centred directly opposite a chain link. Then the fixing device may be brought into engagement with the line at a particular location for correct fixing of the line at this location. By so doing, the fixing device may, for example, be conveyed into an opening in a chain link, as shown on FIGS. 8 and 10 in the subsequent exemplary embodiment.

In this manner, the cutting device is also structured, to a certain extent, in a manner allowing it to travel along, if required in an emergency situation, in the moving direction of the line should the line be moving during the cutting thereof. Thereby, the cutting device remains stationary relative to the line during the very cutting operation. Movement of the line during the cutting, however, is not a desired situation and, if possible, the line should be kept at rest relative to the vessel during the very cutting operation.

Said support may be comprised of a support structure, for example a supporting platform which, via the moving means, is structured so as to be moveable along a deck on the vessel. In one embodiment, this may be carried out by virtue of the support structure being connected to the deck of the vessel via at least one guide element, for example at least one rail, track, pulley or similar structure, which is directed in the moving direction of the line. Further, the fixing device may be structured for remote-controlled activation and operation.

Moreover, the at least one moving means mentioned in the preceding embodiments may comprise a moveable piston. This piston may be driven mechanically, hydraulically, pneumatically or electrically and possibly be disposed in an associated piston cylinder. As an addition or alternative, the at least one moving means may comprise a pitch rack guide, for example in the form of a pinion/toothed gear connected to a toothed bar/rack ("rack and pinion") or similar.

The present cutting device may also be structured for remote-controlled activation and operation, which will increase the personnel safety on board the vessel, among other things.

According to a second aspect of the invention, a method for cutting of a line extending from a floating vessel is provided. The distinctive characteristic of the method is that it comprises the following steps:
  placing at least one cutting device on the vessel, the cutting device comprising the following features:
    at least one guide structured for directional steering of the line past a cutting area for the line; and
    at least one of the following cutting-promoting devices:
      (a) at least one induction coil device directed inwards toward the cutting area and structured for heating, hence weakening, of the line within the cutting area; and
      (b) at least one moveable cutting knife with an opposite contact surface directed inwards toward the cutting area and also structured for cutting of the line within the cutting area;
  conveying the line through said guide and cutting area; and
  when cutting of the line is required, activating at least one of said cutting-promoting devices (a) and (b) and severing the line within the cutting area.

Thereby, the cutting may be carried out by means of at least one induction coil device and/or at least one cutting knife with an opposite contact surface.

For example, said line may be comprised of at least one chain, a metal wire and a fibre line.

In context of the present method, reference is also made to details described hereinbefore in context of the present cutting device.

According to a first embodiment, the method may comprise the following steps:
  placing the at least one induction coil device on the vessel;
  conveying a metallic line through said guide and cutting area; and
  when cutting of the metallic line is required, activating the induction coil device and heating, hence weakening, the metallic line within the cutting area until severing the line.

In this first embodiment of the method, the cutting is carried out simply by means of one or more induction coil devices.

According to a second embodiment, the method may comprise the following steps:
  placing the at least one moveable cutting knife with an opposite contact surface on the vessel;

conveying the line through said guide and cutting area, the cutting area being located between the cutting knife and the opposite contact surface; and when cutting of the line is required, moving the at least one cutting knife toward the opposite contact surface until severing the line.

In this second embodiment of the method, the cutting is carried out simply by means of one or more cutting knives.

According to a third embodiment, the method may comprise the following steps:

placing both the at least one induction coil device and the at least one moveable cutting knife on the vessel;

conveying a metallic line through said guide and cutting area, the cutting area being located between the cutting knife and the opposite contact surface;

when cutting of the metallic line is required, activating the induction coil device and heating, hence weakening, the metallic line within the cutting area and moving the at least one cutting knife toward the opposite contact surface until severing the line.

In this third embodiment of the method, the cutting is carried out by means of at least one induction coil device and at least one cutting knife. In this context, the metallic line may be heated, hence weakened, prior to the line being cut by the at least one cutting knife. Alternatively, the metallic line may be heated, hence weakened, at the same time as the line is cut by the at least one cutting knife.

According to the method, the cutting device may be placed on or near a deck on the vessel.

The line may also be connected to a spooling apparatus placed on the vessel for spooling of the line.

Further, the cutting device may also comprise or be connected to a fixing device for is fixing of the line during cutting thereof. Advantageously, this fixing device may be disposed between the at least one cutting-promoting device of the cutting device and a fastening point of the line on the vessel.

Yet further, the cutting device and the fixing device may be connected to a support, and the support may be connected to a moving means structured so as to be moveable in the moving direction of the line. By so doing, the fixing device may travel along in the moving direction of the line during the cutting thereof, whereby the cutting device remains stationary relative to the line during the very cutting operation. In this context, said support may be comprised of a support structure arranged so as to be moveable along a deck on the vessel.

Moreover, the cutting device and/or the fixing device may be activated and operated by means of remote control, which increases personnel safety on board the vessel.

According to a third aspect of the invention, a use of a cutting device for cutting of a line extending from a floating vessel is provided, wherein the cutting device comprises:

(a) at least one guide structured for directional steering of the line past a cutting area for the line; and (b) at least one of the following cutting-promoting devices:
at least one induction coil device directed inwards toward the cutting area and structured for heating, hence weakening, of the line within the cutting area; and
at least one moveable cutting knife with an opposite contact surface directed inwards toward the cutting area and also structured for cutting of the line within the cutting area.

In this context, reference is also made to details described hereinbefore in context of the present cutting device and method.

Hereinafter, a non-limiting exemplary embodiment of the present invention will be shown.

SHORT DESCRIPTION OF FIGURES OF THE EXEMPLARY EMBODIMENT

The figures are schematic and may be somewhat distorted with respect to relative size and relative placement of components constituting parts of the exemplary embodiments of the invention. In general, identical or corresponding details of the figures will be denoted with the same or similar reference numerals in the following.

Exemplary Embodiment of the Invention

Figure 1:
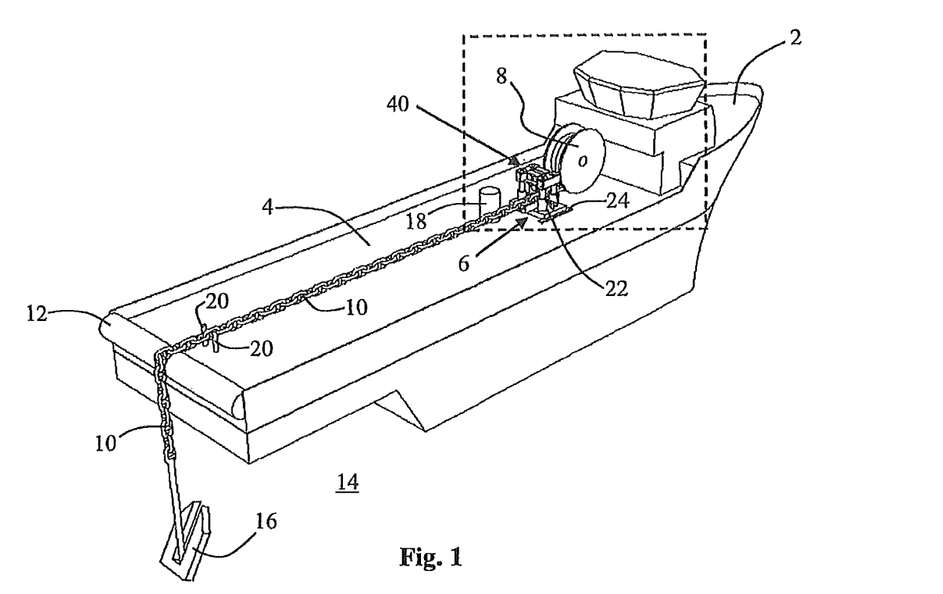
FIG. 1 is a perspective drawing of an anchor handling vessel provided with a cutting device according to the invention, wherein the figure also shows a section box around the cutting device.
Figure 2:
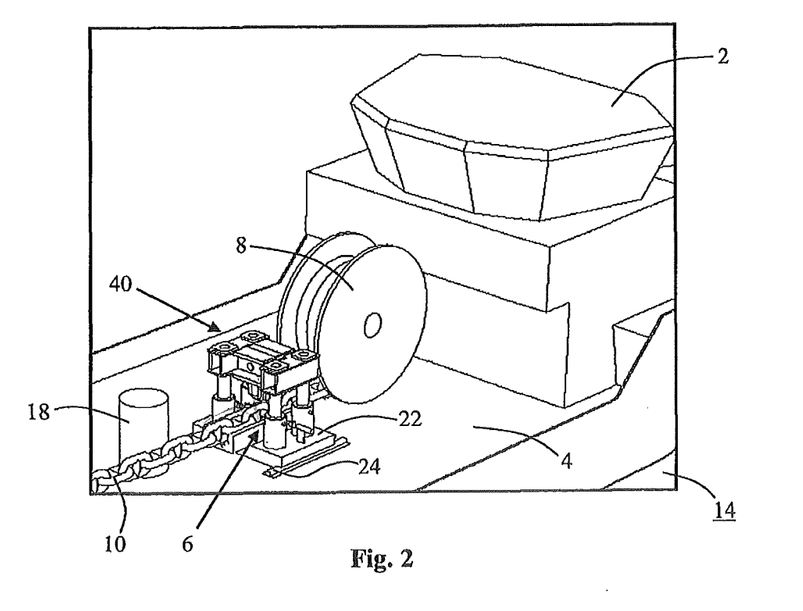
FIG. 2 shows, in larger scale, the section box from FIG. 1.

FIGS. 1 and 2 show an anchor handling vessel 2 with a deck 4 which, at the forward end thereof, is provided with, among other things, a cutting device 6 according to the invention and a large guide wheel 8 arranged between the cutting device 6 and a cabelar wheel (not shown) at the forward end of the deck 4. Via the guide wheel 8, a very heavy duty chain 10 may be spooled out or in via the cabelar wheel. The chain 10 is spooled out from/into a cargo hold (not shown) within the vessel 2. The function of the guide wheel is to guide the chain 10 correctly into the cutting device 6. The chain 10 extends from the forward to the aft end of the deck 4 and onwards over the stern 12 and down into the sea 14 where the chain 10 is connected to a large and heavy anchor 16.

For directional steering of the chain across the deck 4, the deck 4 is also provided with a support pillar 18 at the forward end thereof, and also two guide pegs 20 at the aft end thereof between which the chain 10 extends.

In this embodiment, the cutting device 6 is placed on a supporting platform 22 which is connected in a moveable manner to two rails 24 disposed on the deck 4, and in the moving direction of the chain 10 across the deck 4. The rails shown in FIGS. 1 and 2 are schematic and, in practice, may have any suitable length. For longitudinal movement of the platform 22, it may be connected to one or more pistons, pitch rack guides, motors, control units and similar (not shown) providing and controlling the movement. In this embodiment, the movement of the platform 22 is activated and operated interactively via remote control. For this purpose, the platform 22 is also provided with at least one surveillance camera and at least one light source (not shown). As an alternative or addition, the platform movement may be controlled more or less automatically through suitable control technology and associated means therefor. Thereby, the cutting device 6 may, if required, travel along in the moving direction of the chain 10 during the cutting thereof, whereby the cutting device remains stationary relative to the chain 10 during the very cutting operation. As mentioned above, however, movement of the line during the cutting is not a desired situation and, if possible, the line should be kept at rest relative to the deck 4 during the very cutting operation. Also the cutting device 6 is activated and operated by means of remote control.

Figure 3:
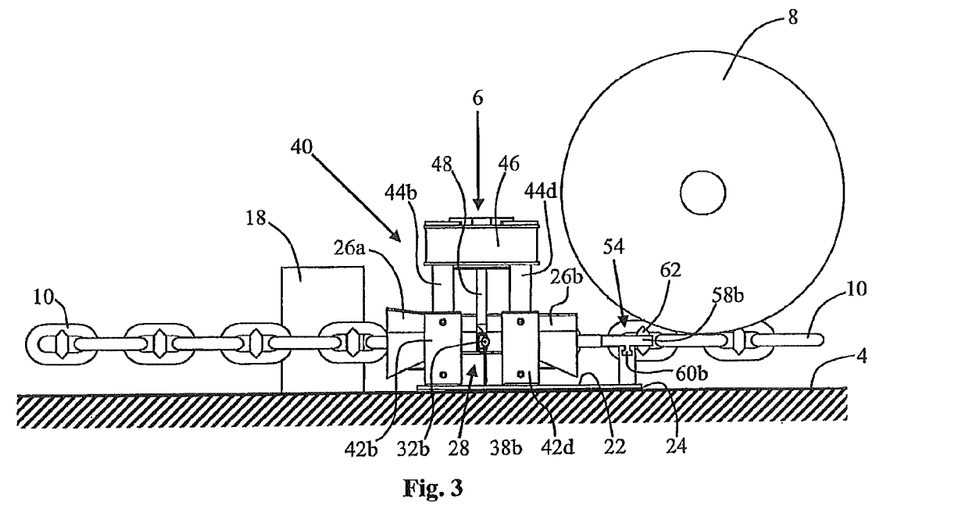
FIGS. 3 and 4 show, in larger scale, a front elevation and a base view, respectively, of the cutting device according to FIGS. 1 and 2, including a fixing device for gripping and fixing of a chain link in the chain, and also other associated equipment.
Figure 4:
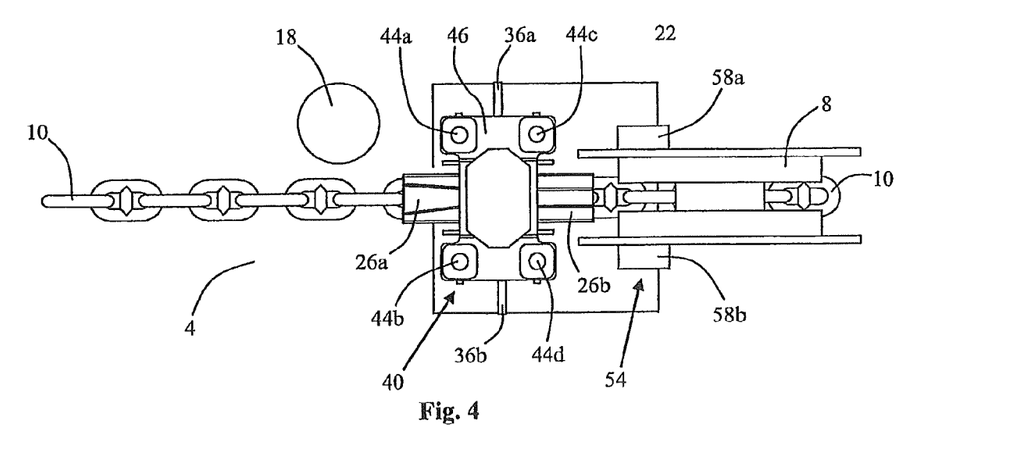

As shown in FIGS. 3 and 4, the cutting device 6 comprises, among other things, two guides 26a and 26b, i.e. one guide on each side of the cutting device 6, for conveying the chain 10 via the cutting device 6 and past a cutting area 28 thereof. The pay out direction of the chain 10 is toward the left in FIGS. 3 and 4.

The cutting device 6 also comprises several cutting-promoting devices structured in a manner allowing them to separate/sever a horizontally lying, first chain link 30 in the chain 10. By means of said guides 26a, 26b, the chain link 30 will be disposed horizontally prior to these cutting-promoting devices being activated for separation/severing of the chain link 30. In this embodiment, the cutting-promoting devices are comprised of both induction coil devices and cutting knives, and all of these devices are structured so as to be moveable inwards toward the cutting area 28.

As such, the cutting device 6 comprises a first induction coil device 32a and an oppositely directed, second induction coil device 32b. Both induction coil devices 32a, 32b are directed horizontally inwards toward the cutting area 28 and may be moved in this direction for heating and weakening of the first chain link 30 within the cutting area 28. Thereby, the first induction coil device 32a may heat up a first side 30a of the chain link 30, whereas the second induction coil device 32b may heat up a second side 30b of the chain link 30. In order to be moved horizontally inwards toward the cutting area 28, each induction coil device 32a, 32b is connected to a respective piston rod 34a, 34b emerging from an associated, horizontally extending hydraulic cylinder 36a, 36b.

The cutting device 6 also comprises a first cutting knife 38a and a parallel, second cutting knife 38b. Both cutting nives 38a, 38b are directed vertically inwards toward the cutting area 28 and may be moved in this direction for cutting of the first chain link 30 within the cutting area 28. In this embodiment, the contact surface of the first cutting knife 38a is comprised of a third cutting knife 38c structured for cutting-cooperation with the first cutting knife 38a, whereas the contact surface of the second cutting knife 38b is comprised of a fourth cutting knife 38d structured for cutting-cooperation with the second cutting knife 38b. Thus, the first cutting knife 38a and the third cutting knife 38c form a first set of cooperating cutting knives, whereas the second cutting knife 38b and the fourth cutting knife 38d form a second set of cooperating cutting knives. In this context, the edges of the first and the third cutting knife 38a, 38c, and also the edges of the second and the fourth cutting knife 38b, 38d, are aligned directly opposite each other. Thereby, the first and third cutting knife 38a, 38c may cooperate in order to cut the first side 30a of the chain link 30, whereas the second and fourth cutting knife 38b, 38d may cooperate in order to cut the second side 30b of the chain link 30.

In order to be moved vertically inwards toward the cutting area from above, the first and second cutting knife 38a, 38b is connected to a hydraulic power pack 40 placed on said platform 22, whereby the power pack 40 is moveable along the deck 4 via said rails 24, cf. FIGS. 3 and 4. The power pack 40 comprises, among other things, four vertical and powerful hydraulic cylinders 42a, 42b, 42c and 42d with associated, powerful piston rods 44a, 44b, 44c and 44d emerging therefrom in an upward direction. At their upper ends, the piston rods 44 are connected to a joint frame structure 46. A guillotine-resembling knife base 48 is connected to the underside of the frame structure 46 and extends vertically down therefrom. The first and second cutting knife 38a, 38b is attached to the underside of the knife base 48 and at a distance from each other. The underside of the knife base 48 also comprises a recess 50 arranged between the knives 38a, 38b in order to accommodate vertically standing chain links during advancement or cutting of the chain 10.

Further, said third and fourth cutting knife 38c, 38d is structured in a manner allowing it to move, to some extent, vertically upwards toward the cutting area 28 for severing engagement with its respective side 30a, 30b of the chain link 30. In order to be moved vertically inwards toward the cutting area from below, the third and fourth cutting knife 38c, 38d is disposed at the upper end of its respective and vertical hydraulic cylinder 52a and 52b also placed on said platform 22.

Moreover, FIGS. 3, 4, 6, 8 and 10 show a special embodiment wherein the cutting device 6 also comprises a fixing device 54 for fixing of a vertically standing, second chain link 56 in the chain 10 when the horizontally lying, first chain link 30 is severed in the cutting device 6. Such a fixing of the chain 10 is capable of preventing a potentially damaging backlash of the chain 10 upon being severed. In this embodiment, the fixing device 54 is activated and operated interactively via remote control. For this purpose, the same surveillance camera and light source (not shown), among other things, is used as that mentioned for interactive movement of the platform 22. It is stressed, however, that such a fixing device 54 is not a prerequisite for allowing the cutting device 6 to work as intended.

As an alternative or addition, the activation and movement of the fixing device 54 relative to the chain 10 may be carried out more or less automatically by means of s suitable control technological auxiliary means. Thus, the fixing device (or the cutting device 6) may be provided with a sensor device, for example a pivotal arm provided with an outer wheel or guide, or a sensor, for example a laser meter, structured in a manner allowing it to record the distance between a reference point and chain links in the chain 10. This distance will vary depending on whether the distance is measured to a vertically standing or a horizontally lying chain link in the chain 10, and depending on the position of the particular chain link relative to said reference point. On the basis of such varying distance measurements, it is possible to establish distance measurements corresponding to correct positions of a second chain link 56 relative to the fixing device 54. When in such correct positions, the fixing device 54 may be is activated for engagement with the second chain link 56 (cf, FIG. 8). By so doing, it is also possible to establish distance measurements corresponding to incorrect positions of a second chain link 56 relative to the fixing device 54 (cf. FIG. 6). When in such incorrect positions, the fixing device 54 is not activated. However, a movement of said platform 22 is activated, whereby the fixing device 54 and the cutting device 6 are moved parallel to the chain 10 until said sensor device records a correct position of the fixing device 54 relative to the second chain link 56. Then the movement of the platform 22 is stopped and the fixing device 54 is conveyed inwards toward the second chain link 56 for fixing engagement therewith (cf. FIG. 10). In advance, said distance informations have been entered into a database affiliated with a suitable processor with an associated control program and -equipment for control of the movements of the platform 22 and the fixing device 54.

Figure 10:
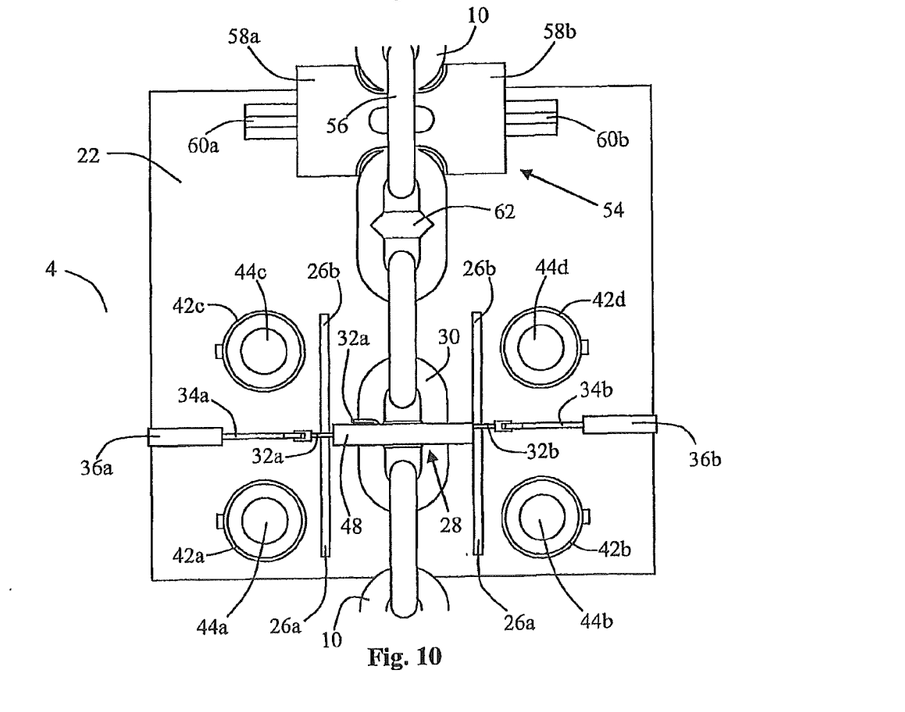

Similar to the induction coil devices 32a, 32b, the fixing device 54 comprises a first gripping element 58a and an oppositely directed, second gripping element 58b, both of which are directed horizontally inwards toward the chain 10 and the second chain link 56 to be fixed by the gripping elements 58a, 58b. The gripping elements 58a, 58b are structured so as to be moveable along a respective rail 60a, 60b placed on said platform 22, and between the cutting device 6 and the guide wheel 8. Each gripping element 58a, 58b is also connected to a moving means (not shown, for example a piston, a pitch rack guide or similar, for allowing the gripping element 58a, 58b to be moved horizontally relative to the chain 10. Furthermore, each gripping element 58a, 58b is of a shape that fits in between two successive, horizontal chain links. The gripping surface on each gripping element 58a, 58b is also of a shape that fits within the inner opening of the vertically standing, second chain link 56, and which fits around a respective side of a transverse strut beam 62 disposed within said opening and between the side of the chain link 56, as shown in FIG. 10. Moreover, each chain link is provided with such a strut beam 62. The primary object of the strut beam 62 is to prevent collapse of the chain link when being gripped and advanced via the guide wheel 8 and the cabelar wheel (not shown).

Reference is now made to FIGS. 5-13 for description of the advancement and cutting of the chain 10.

Figure 5:
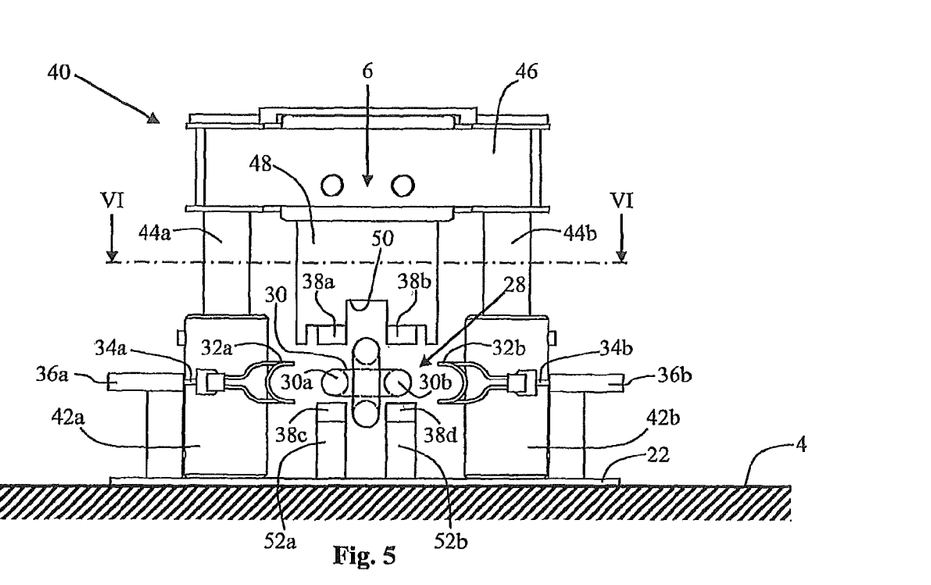
FIGS. 5 and 6 show, in larger scale, a front elevation and a base view, respectively, of the cutting device whilst a chain is conveyed past the cutting device and said fixing device, insofar as the plan view is seen along section line VI-VI in FIG. 5.
Figure 6:
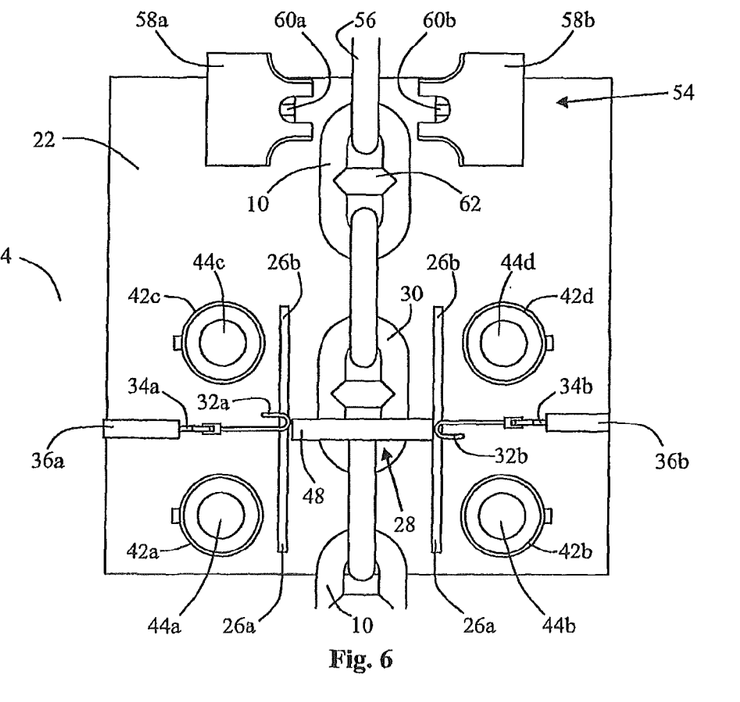

FIGS. 5 and 6 show the chain 10 whilst being conveyed past the cutting device 6 and the fixing device 54. When in this position, the induction coil devices 32a, 32b, the cutting knives 38a, 38b, 38c, 38d and also the gripping elements 58a, 58b are inactive and not in contact with the chain 10.

Figure 7:
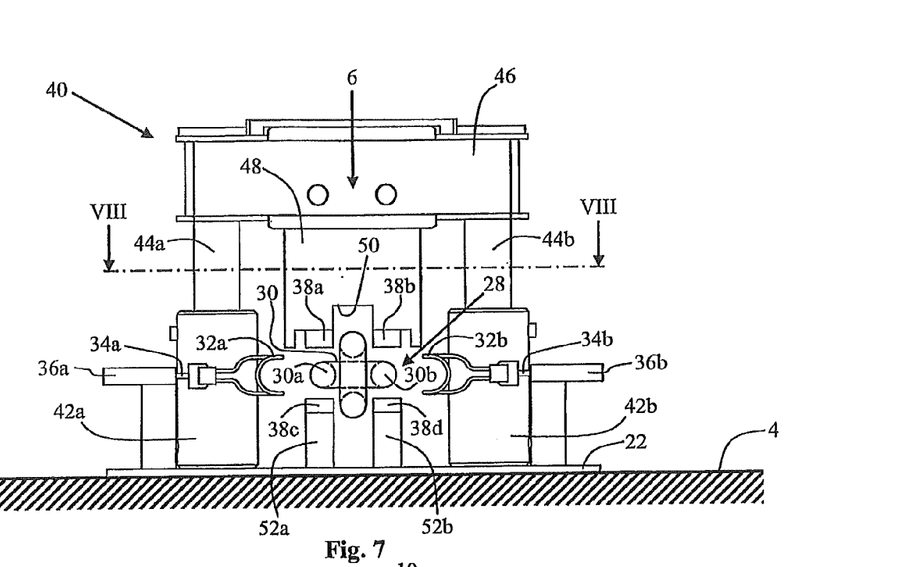
FIGS. 7 and 8 show, in larger scale, a front elevation and a base view, respectively, of the cutting device whilst a vertically standing, second chain link is located in a suitable position for allowing it to be gripped and fixed by said fixing device, insofar as the plan view is seen along section line VIII-VIII in FIG. 7.
Figure 8:
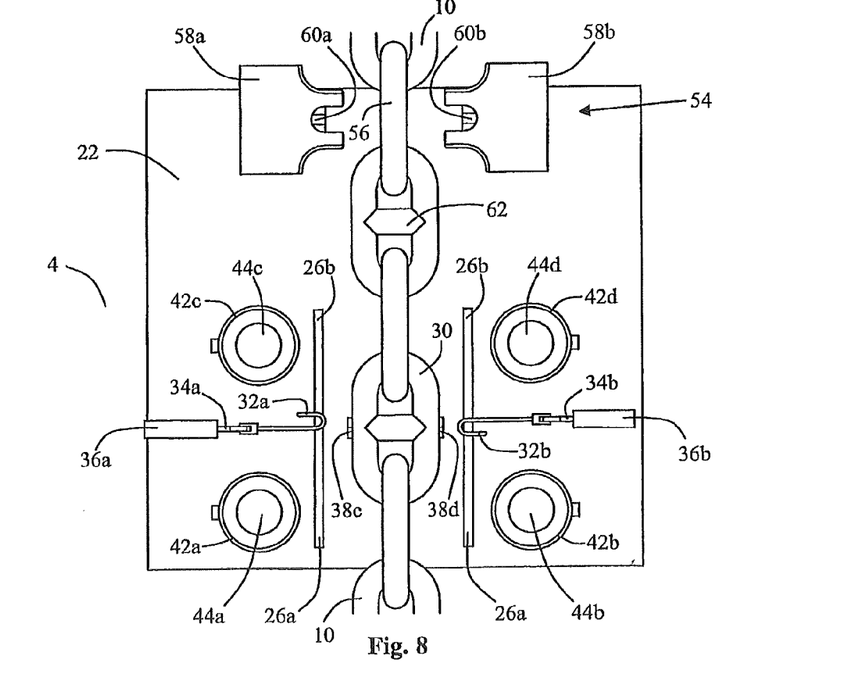

FIGS. 7 and 8 show the chain 10 when the second chain link 56 is located halfway is between the gripping elements 58a, 58b and immediately before they are activated and conveyed inwards toward the chain link 56 for gripping and fixing thereof. When in this position, the induction coil devices 32a, 32b and the cutting knives 38a, 38b, 38c, 38d are still inactive and not in contact with the chain 10.

Figure 9:
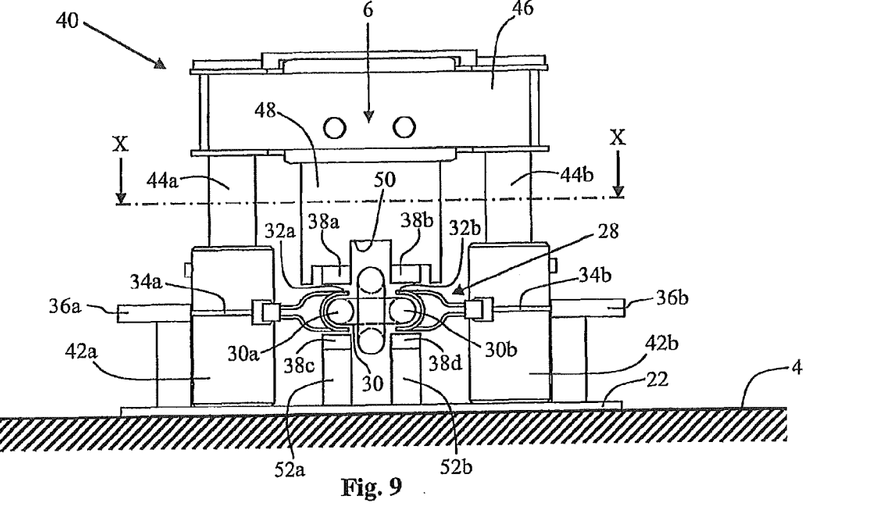
FIGS. 9 and 10 show, in larger scale, a front elevation and a base view, respectively, of the cutting device whilst the second chain link is being fixed by the fixing device, and after having conveyed two induction coil devices inwards toward respective sides of a horizontally lying, first chain link so as to be in the process of heating the sides of the chain link, insofar as the plan view is seen along section line X-X in FIG. 9.

FIGS. 9 and 10 show the chain 10 after having conveyed the gripping elements 58a, 58b into the opening in the second chain link 56, and around each respective side of said strut 62, whereby said chain link 56 is fixed in place. By so doing, the first chain link 30 to be cut also remains stationary within the cutting area 28 of the cutting device 6. Disposed in this position, said two induction coil devices 32a, 32b have been conveyed inwards and bear against the respective sides 30a, 30b of the horizontally lying, first chain link 30. FIGS. 9 and 10 also show the induction coil devices 32a, 32b whilst in the process of heating the sides 30a, 30b of the chain link 30. When in this position, the cutting knives 38a, 38b, 38c, 38d are still inactive and not in contact with the chain 10.

Figure 11:
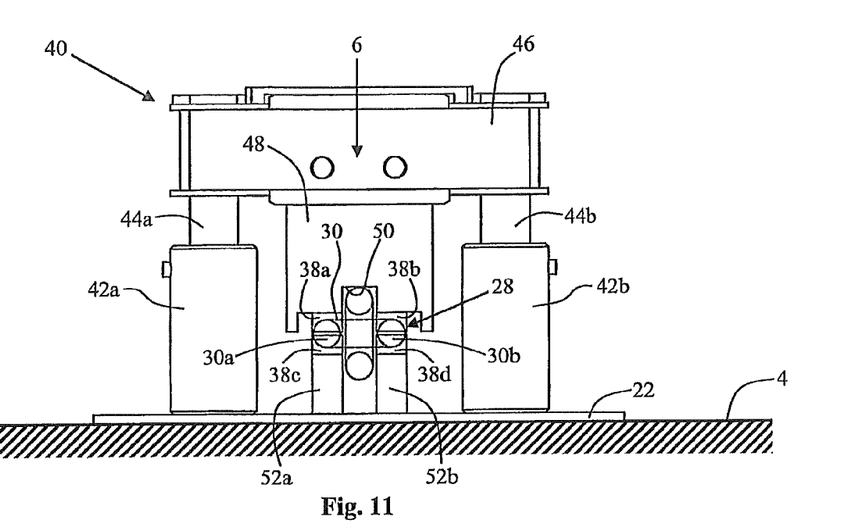
FIG. 11 shows, in larger scale, a front elevation of the cutting device immediately after two sets of cooperating cutting knives having severed the respective, heated sides of the first chain link.

FIG. 11 shows the subsequent step wherein the cooperating knife set 38a, 38c and the cooperating knife set 38b, 38d have been activated and have severed the first side 30a and the second side 30b, respectively, of the horizontally lying, first chain link 30. In this context, the hydraulic power pack 40 has been activated in order to convey the piston rods 44a, 44b, 44c and 44d, and hence the knife base 48 and Its parallel cutting knives 38a, 38b, downwards toward the cutting area 28 and the chain link 30.

At the same time, the vertical hydraulic cylinders 52a, 52b, which are disposed below the chain link 30, have been activated for conveying its attached and opposite cutting knives 38c, 38d upwards toward the cutting area 28 and the chain link 30. During the very severing, the induction coil devices 32a, 32b may be retracted from the chain link 30, or they may still be placed partially around the respective sides 30a, 30b of the chain link 30. In the latter case, the induction coil devices 32a, 32b may become destroyed by the cutting knives 38a, 38b, 38c, 38d which, however, is of secondary importance given that the devices 32a, 32b may be readily replaced. The tensile load acting, during the cutting operation, on the chain link 30 due to the weight of the chain 10 and the anchor 16 in the sea 14, will also contribute to weaken the chain link 30 faster and further, which increases the effectiveness of the cutting operation. This tensile load will also be able to pull the severed chain 10 over the stern 12 of the vessel 2 and down into the sea 14 after the cutting of the chain link 30.

Figure 12:
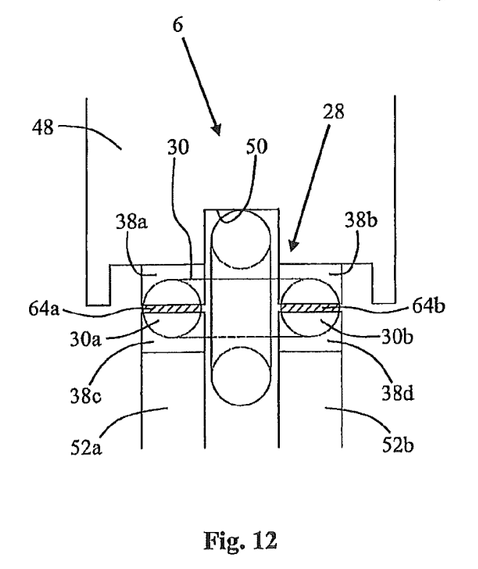
FIG. 12 shows, in even larger scale, a section of FIG. 11 around the cutting area of the first chain link.

An enlarged section of the cutting position according to FIG. 11 is shown in FIG. 12.

Figure 13:
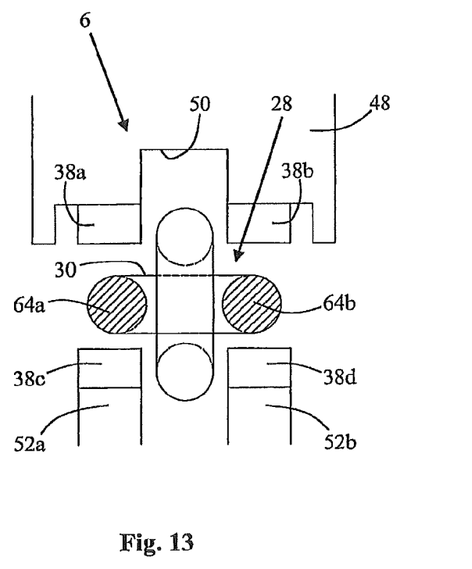
FIG. 13 shows said section after having removed the cutting knives from said cutting area.

FIG. 13, however, shows the cutting knives 38a, 38b, 38c, 38d after being retracted from the cutting area 28. Thereby, complete cut surfaces 64a, 64b on the respective sides 30a, 30b of the chain link 30 become visible.

The invention claimed is:

1. A cutting device for mechanical cutting of a load-burdened chain extending from a floating vessel, the chain having a plurality of chain links, the cutting device comprising:
   a guide device that guides the chain through a cutting area;
   parallel first and second cutting knives that are configured to move into the cutting area to simultaneously cut completely through a first link of the plurality of chain links;
   parallel third and fourth cutting knives that are opposed to the first and second cutting knives, the third and fourth cutting knives being configured to move into the cutting area to simultaneously cut completely through the first link; and
   a first moving device that is configured to simultaneously move the first, second, third and fourth cutting knives into the cutting area so that the first and second cutting knives engage with the third and fourth cutting knives, respectively, to simultaneously cut through the first link.

2. The cutting device according to claim 1, wherein the first moving device comprises a hydraulic cylinder and a piston rod for each of the first, second, third and fourth cutting knives and a hydraulic power pack that is configured to power each of the piston rods.

3. The cutting device according to claim 2, wherein each of the hydraulic cylinders and piston rods are coupled to a common frame.

4. The cutting device according to claim 1, wherein the first cutting knife is vertically disposed above the third cutting knife and wherein the second cutting knife is vertically disposed above the fourth cutting knife.

5. The cutting device according to claim 1, wherein the guide device comprises first and second guides positioned on opposite sides of the cutting area and structured to orient the first link for cutting by the first, second, third and fourth cutting knives.

6. The cutting device according to claim 5, comprising a first recess between the first and second cutting knives and a second, oppositely oriented recess between the third and fourth cutting knives; wherein when the first and second knives and third and fourth knives are moved into the cutting area, the first and second recesses cooperatively receive a second link that is transversely oriented with respect to the first link.

7. The cutting, device according to claim 1, comprising a first and second heating devices that are configured to move into the cutting area to simultaneously heat opposite sides of the link.

8. The cutting devices according to claim 7, wherein the first and second heating devices comprise induction coil heaters.

9. The cutting device according to claim 8, comprising a second moving device that is configured to move the first and second heating devices into the cutting area.

10. The cutting device according to claim 1, comprising a fixing device for fixing a second link that is transversely oriented with respect to the first link when the first link is disposed in the cutting area.

11. The cutting device according to claim 10, wherein the fixing device comprises oppositely oriented first and second gripping elements which are configured to move into the cutting area to fix the second link.

12. The cutting device according to claim 11, wherein each of the first and second gripping elements have an end portion that fits into an inner opening defined by the second link.

13. The cutting device according to claim 1, wherein the guide device comprises a guide wheel that is configured to guide the chain into the cuffing area.

14. The cutting device according to claim 1, comprising a platform supporting the first, second, third and fourth cutting devices.

15. The cutting device according to claim 14, comprising at least one rail that supports the platform such that the platform is longitudinally movable with respect to the chain.

16. The cutting device according to claim 15, comprising a device for moving the platform along the at least one rail.

17. A cutting arrangement comprising:
   a floating vessel;
   a load-burdened chain having a plurality of chain links and extending from the floating vessel;
   a cutting device disposed on the floating vessel, the cutting device comprising:
      a guide that is configured to guide the chain through a cutting area;
      parallel first and second cutting knives that are configured to vertically move into the cutting area to simultaneously cut completely through a first link in the plurality of chain links; and
      a first moving device that is configured to move the first and second cutting knives into the cutting area so that the first and second cutting knives simultaneously cut completely through the first link.

18. The cutting arrangement according to claim 17, comprising parallel third and fourth cutting knives that are opposed to the first and second cutting knives, the third and fourth cutting knives being configured to move into a cutting area to simultaneously cut through the first link; and wherein the first moving device is configured to simultaneously move the first, second, third and fourth cutting knives into the cutting area so that the first and second cutting knives cooperate with the third and fourth cutting knives to simultaneously cut through the first link.

19. The cutting, arrangement according to claim 18, wherein the first cutting knife is vertically disposed above the third cutting knife and wherein the second cutting knife is disposed vertically above the fourth cutting knife.

20. The cutting arrangement according to claim 19, comprising a platform supporting the first, second, third and fourth cutting devices.

21. The cutting arrangement according to claim 20, comprising at least one rail that supports the platform such that the platform is configured to longitudinally move with respect to the chain.

22. The cutting arrangement according to claim 21, comprising a device that is configured to move the platform along the at least one rail.

23. The cutting arrangement according to claim 17, wherein a second link in the chain comprises a strut beam that is configured to prevent collapse of the second link and further comprising a fixing device for fixing the second link when the first link is disposed in the cutting area; wherein the fixing device comprises oppositely oriented first and second gripping elements that are configured to move into the cutting area to fix the second link; wherein each of the first and second gripping elements have an end portion that its into an inner opening defined by the second link; and wherein the first and second gripping elements fit around opposite sides of the strut beam, respectively.

* * * * *

UNITED STATES PATENT AND TRADEMARK OFFICE
CERTIFICATE OF CORRECTION

PATENT NO. : 9,038,513 B2
APPLICATION NO. : 14/192335
DATED : May 26, 2015
INVENTOR(S) : Birkeland Page 1 of 1

It is certified that error appears in the above-identified patent and that said Letters Patent is hereby corrected as shown below:

In the Claims:

Claim 7, column 13, line 4: delete "," between the words "cutting" and "device".

Claim 13, column 13, line 27: delete "cuffing" insert --cutting--.

Claim 19, column 14, line 18: delete "," between the words "cutting" and "arrangement".

Claim 23, column 14, line 41: delete "its" insert --fits--.

Signed and Sealed this
Twentieth Day of October, 2015

Michelle K. Lee
*Director of the United States Patent and Trademark Office*